(12) United States Patent
Zhang et al.

(10) Patent No.: US 10,878,541 B2
(45) Date of Patent: Dec. 29, 2020

(54) OBJECT AWARE LOCAL TONE MAPPING

(71) Applicant: GoPro, Inc., San Mateo, CA (US)

(72) Inventors: Heng Zhang, San Mateo, CA (US);
Thomas Nicolas Emmanuel Veit, Meudon (FR); Guillaume Matthieu Guérin, Paris (FR)

(73) Assignee: GoPro, Inc., San Mateo, CA (US)

( * ) Notice: Subject to any disclaimer, the term of this patent is extended or adjusted under 35 U.S.C. 154(b) by 61 days.

(21) Appl. No.: 16/137,048

(22) Filed: Sep. 20, 2018

(65) Prior Publication Data
US 2020/0098098 A1   Mar. 26, 2020

(51) Int. Cl.
*G06T 5/00*      (2006.01)
*G06T 5/20*      (2006.01)
*H04N 9/64*      (2006.01)

(52) U.S. Cl.
CPC .............. *G06T 5/008* (2013.01); *G06T 5/20* (2013.01); *H04N 9/643* (2013.01); *G06T 2207/10024* (2013.01); *G06T 2207/20028* (2013.01); *G06T 2207/20208* (2013.01); *G06T 2207/30201* (2013.01)

(58) Field of Classification Search
CPC ............ G06T 5/008; G06T 5/20; H04N 9/643
USPC ........................................................ 382/167
See application file for complete search history.

(56) References Cited

U.S. PATENT DOCUMENTS

| 2013/0322753 A1* | 12/2013 | Lim ....................... G06T 5/001 |
| | | 382/167 |
| 2014/0010448 A1 | 1/2014 | Lischinski |
| 2017/0301095 A1* | 10/2017 | Zhang .................. G06T 11/005 |

FOREIGN PATENT DOCUMENTS

EP          2509044 A2      10/2012

OTHER PUBLICATIONS

Arpna Patel et al: "LDR Image from HDR by Using Fast and Saliency Based Tone-Mapping Algorithm: A Review", International Journal of Scientific Progress and Research (IJSPR), Jan. 1, 2015 (Jan. 1, 2015), pp. 2349-4689, XP055637533, Retrieved from the Internet: URL:https://pdfs.semanticscholar.org/eef9/5856842bea016b25b26e5fbf23fc5d18a060.pdf [retrieved on Oct. 30, 2019].

(Continued)

*Primary Examiner* — Michael R Neff
(74) *Attorney, Agent, or Firm* — Young Basile Hanlon MacFarlane, P.C.

(57) ABSTRACT

Systems and methods are disclosed for image signal processing. For example, methods may include accessing an image from an image sensor; detecting an object area on the image; classifying the object area on the image; applying a filter to an object area of the image to obtain a low-frequency component image and a high-frequency component image; determining a first enhanced image based on a weighted sum of the low-frequency component image and the high-frequency component image, where the high-frequency component image is weighted more than the low-frequency component image; determining a second enhanced image based on the first enhanced image and a tone mapping; and storing, displaying, or transmitting an output image based on the second enhanced image.

20 Claims, 7 Drawing Sheets

(56) References Cited

OTHER PUBLICATIONS

G. Eilertsen et al., "A comparative review of tone-mapping algorithms for high dynamic range video", Computer Graphics Forum, vol. 36, No. 2, May 1, 2017 (May 1, 2017), pp. 565-592, XP055442404, GB ISSN: 0167-7055, DOI: 10.1111/cgf.13148, 28 pages.
International Search Report for Application No. PCT/US2019/048228, dated Nov. 7, 2019, 14 pages.
Jung Cheolkon et al: "Detail-preserving tone mapping for low dynamic range displays with adaptive gamma correction", 2015 Visual Communications and Image Processing (VCIP), IEEE, Dec. 13, 2015 (Dec. 13, 2015), pp. 1-5, XP032894051, DOI: 10.1109/VCIP.2015.7457796 [retrieved on Apr. 21, 2016].
Li Zhengguo et al: "Visual-Salience-Based Tone Mapping for High Dynamic Range Images", IEEE Transactions on Industrial Electronics, IEEE Service Center, Piscataway, NJ, USA, vol. 61, No. 12, Dec. 1, 2014 (Dec. 1, 2014), pp. 7076-7082, XP011558854, ISSN: 0278-0046, DOI: 10.1109/TIE.2014.2314066 [retrieved on Sep. 12, 2014].

\* cited by examiner

OBJECT AWARE LOCAL TONE MAPPING

TECHNICAL FIELD

This disclosure relates to object detection-based local tone mapping.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, local tone mapping may be used to enhance the images. The implementation of local tone mapping may introduce distortions on certain objects appearing within the field of view of the camera and/or the relative positions and orientations of those objects.

SUMMARY

Disclosed herein are implementations of object detection-based local tone mapping.

In a first aspect, the subject matter described in this specification can be embodied in systems that include an image sensor configured to capture an image. The systems include a processing apparatus. The processing apparatus may be configured to access the image from the image sensor. The processing apparatus may be configured to detect an object area on the accessed image and classify the detected object area. The image may be classified into one or more object areas of a first type, one or more object areas of a second type, or both. The processing apparatus may be configured to obtain a local tone mapping for the second type object area of the image. The processing apparatus may be configured to enhance local contrast on the second type object area of the image. The first type object area of the image may be ignored for local tone mapping and contrast enhancement purposes. The first type object area may be classified as a human face, a blue sky, or an object where contrast enhancement is undesirable. The processing apparatus may be configured to obtain, for the second type object area, an enhanced image portion based on the local tone mapping. The processing apparatus may be configured to store, display, or transmit an output image based on the enhanced image portion and the first type object area.

In some implementations, the local tone mapping may be obtained by the processing apparatus by applying a bilateral filter to the second type object area of the image to obtain a low-frequency component image portion and a high-frequency component image portion. In these examples, the processing apparatus may be further configured to obtain, for the second type object area, a second enhanced image portion based on a weighted sum of the low-frequency component image portion and the high-frequency component image portion. The high-frequency component image portion may be weighted more than the low-frequency component image portion. The processing apparatus may be further configured to obtain, for the second type object area, a third enhanced image portion based on the second enhanced image portion and a tone mapping.

In some examples, the processing apparatus may be further configured to obtain, for the second type object area, a perceptual domain image portion based on the third enhanced image portion and a gamma curve that models human perception of contrast. In some examples, the processing apparatus may be further configured to obtain, for the second type object area, a low-frequency component perceptual domain image portion and a high-frequency component perceptual domain image portion as components of the perceptual domain image portion. In some examples, the processing apparatus may be further configured to obtain, for the second type object area, a fourth enhanced image portion based on a weighted sum of the low-frequency component perceptual domain image portion and the high-frequency component perceptual domain image portion. The high-frequency component perceptual domain image portion may be weighted more than the low-frequency component perceptual domain image portion.

In a second aspect, the subject matter described in this specification can be embodied in methods for object detection-based local tone mapping. A method may include obtaining an image from an image sensor. The method may include detecting an object area on the image. The method may include classifying the detected object area. The image may be classified into one or more object areas of a first type, one or more object areas of a second type, or both.

The method may include applying a filter to the second type object area to obtain a low-frequency component image portion and a high-frequency component image portion. The first type object area of the image may be ignored for local tone mapping and contrast enhancement purposes. The first type object area may be classified as a human face, a blue sky, or an object where contrast enhancement is undesirable.

The method may include determining a first enhanced image portion for the second type object area based on a weighted sum of the low-frequency component image portion and the high-frequency component image portion. The high-frequency component image portion may be weighted more than the low-frequency component image portion. The method may include determining a second enhanced image portion for the second type object area based on the first enhanced image portion and a tone mapping. The method may include storing, displaying, or transmitting an output image based on the second enhanced image portion and the first type object area.

In some examples, the determining the second enhanced image portion for the second type object area based on the first enhanced image portion and a tone mapping may include applying the tone mapping to the low-frequency component image portion to obtain gains for respective image portions, applying the gains for respective image portions to corresponding image portions of the first enhanced image portion, or both. In some examples, the method may include determining a perceptual domain image for the second type object area based on the second enhanced image portion and a gamma curve that models human perception of contrast. In some examples, the method may include determining, for the second type object area, a low-frequency component perceptual domain image portion and a high-frequency component perceptual domain image portion as components of the perceptual domain image. In some examples, the method may include determining, for the second type object area, a third enhanced image portion based on a weighted sum of the low-frequency component perceptual domain image portion and the high-frequency component perceptual domain image portion, where the high-frequency component perceptual domain image portion is weighted more than the low-frequency component perceptual domain image portion. In some examples, the output image may be based on the third enhanced image portion and the first type object area.

In some examples, the determining the low-frequency component perceptual domain image portion may include applying a transformation, based on the gamma curve, to a result of applying the tone mapping to the low-frequency component image portion. In some examples, the determining the output image may include determining gains for respective image portions based on the third enhanced image portion and the gamma curve, applying the gains for respective image portions to corresponding image portions of the image, or both.

In a third aspect, the subject matter described in this specification can be embodied in an image capture device. The image capture device may include an image sensor configured to capture an image and a processing apparatus. The processing apparatus may be configured to access the image from the image sensor. The processing apparatus may be configured to detect an object area on the received image. The processing apparatus may be configured to classify the detected object area into a first type object area or a second type object area. The processing apparatus may be configured to apply a filter to the second type object area to obtain a low-frequency component image portion and a high-frequency component image portion. The processing apparatus may be configured to apply a non-linear mapping to the low-frequency component image portion to obtain gains for respective image portions. The processing apparatus may be configured to apply the gains for respective image portions to corresponding image portions of the second type object area to obtain an enhanced image portion. The processing apparatus may be configured to store, display, or transmit an output image based on the enhanced image and the first type object area.

The processing apparatus of the image capture device may be configured to determine the non-linear mapping based on a histogram analysis of image portions of the of the low-frequency component image portion. The processing apparatus may be configured to determine, for the second type object area, a perceptual domain image portion based on the enhanced image and a gamma curve that models human perception of contrast.

In some examples, the processing apparatus may be configured to determine, for the second type object area, a low-frequency component perceptual domain image portion and a high-frequency component perceptual domain image portion as components of the perceptual domain image. In some examples, the processing apparatus may be configured to determine, for the second type object area, an enhanced perceptual domain image based on a weighted sum of the low-frequency component perceptual domain image portion and the high-frequency component perceptual domain image portion, where the high-frequency component perceptual domain image portion is weighted more than the low-frequency component perceptual domain image portion. In some examples, the output image may be based on the enhanced perceptual domain image and the first type object area.

In some examples in which the processing apparatus is configured to determine the low-frequency component perceptual domain image, the processing apparatus may be further configured to apply a transformation, based on the gamma curve, to a result of applying the gains for respective image portions to the low-frequency component image portion. In some examples in which the processing apparatus is configured to determine the output image, the processing apparatus may be further configured to determine gains for respective image portions based on the enhanced perceptual domain image and the gamma curve, apply the gains for respective image portions to corresponding image portions of the image, or both.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
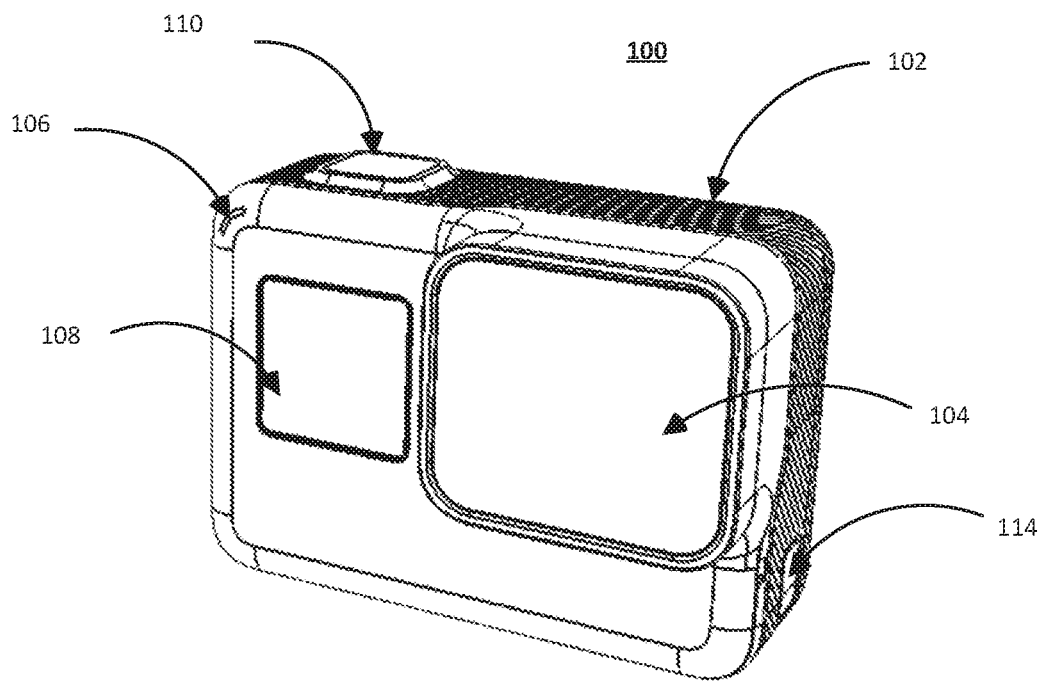
FIG. 1A is a diagram of an example of an isometric view of an image capture device for content capture.
Figure 1B:
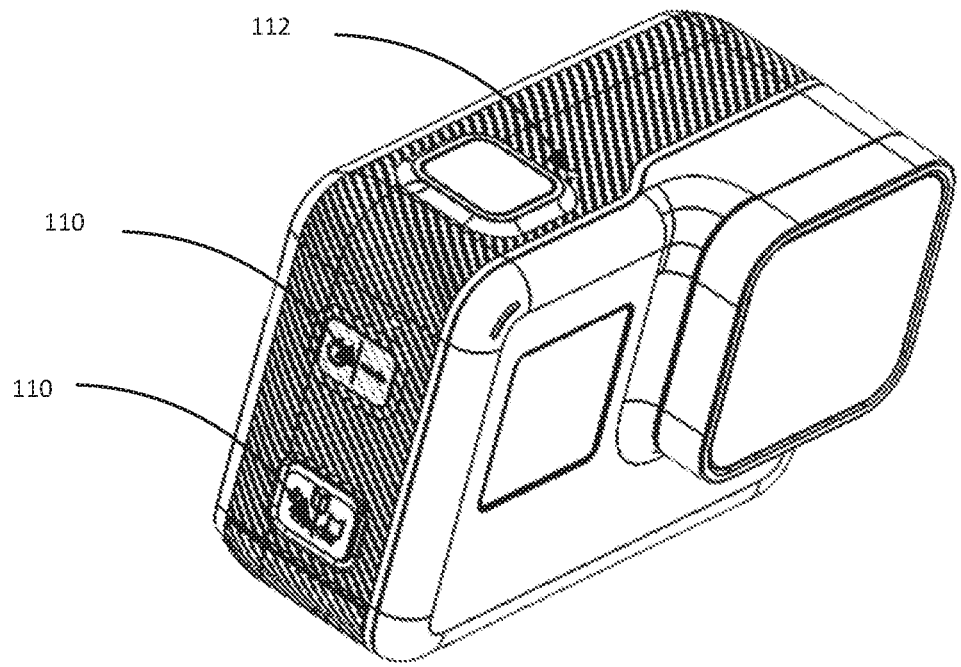
FIG. 1B is a diagram of an example of an isometric view of an image capture device for content capture.
Figure 1C:
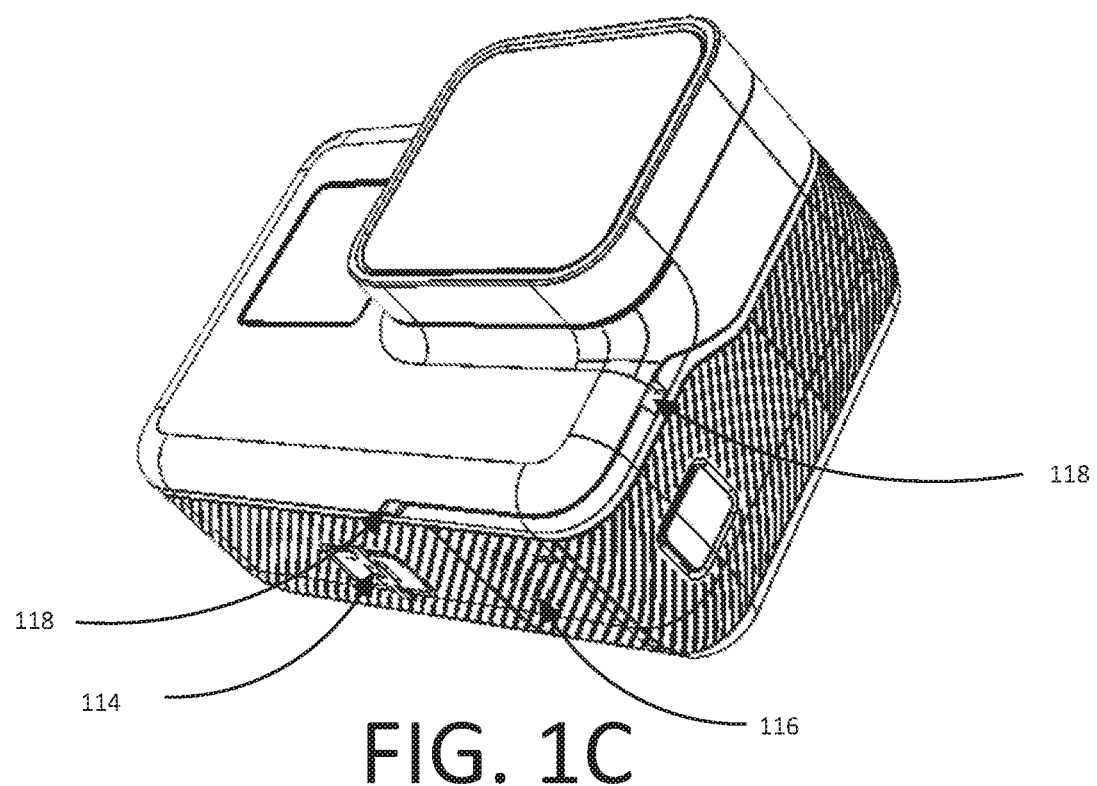
FIG. 1C is a diagram of an example of an isometric view of an image capture device for content capture.
Figure 1D:
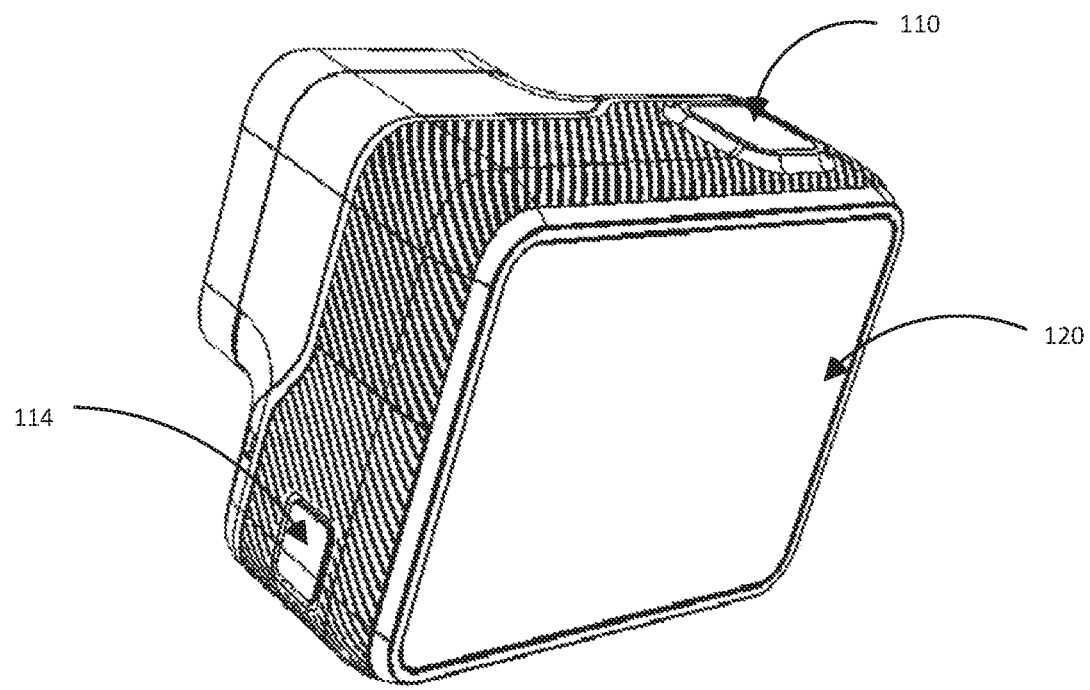
FIG. 1D is a diagram of an example of an isometric view of an image capture device for content capture.

This document includes disclosure of systems, apparatus, and methods for object detection-based local tone mapping to enable enhancement of the quality of images generated by image capture systems. Tone mapping is a process of adjusting image luminance to improve contrast. Tone mapping may be composed of two parts: (1) a non-linear response that mimics the eye non-linear response to luminance, which is independent to the image content and may be known as a gamma curve $\gamma(\ )$ and (2) an image dependent contrast enhancement that may be known as a tone curve $\lambda(\ )$ (e.g., a tone curve that when applied to a specific image implements luminance histogram equalization). For example, a gamma curve may transform the luminance value v according to $\gamma(v)=v\char`\^g$, with g<1, so that dark shades are lightened. When a tone curve is independent of the pixel location in the image, this may be known as global tone mapping. A problem with global tone mapping is that some parts of the image see their contrast lowered (e.g., the contrast of brighter regions of an image may be lowered).

To address the problem of reduced contrast caused by a global tone mapping, a local tone mapping may be applied that enhances contrast locally. For example, a principle of a local tone mapping may be to determine components of an input image, including a low-frequency component image (e.g., a base layer of the image or a smooth version of the image) and a high-frequency component image (e.g., details of the image, which may be a compliment of a base layer), to enable different treatment of these components for enhancement of details and/or local contrast. For example, a low-frequency component image (e.g., a base layer image) may be determined from the image using an un-sharp mask filter or a bilateral filter. In some implementations, details and/or contrast are enhanced by multiplying the high-frequency component image (e.g., the compliment of a base layer) by a constant $\alpha > 1$ and adding it back to the low-frequency component to obtain an enhanced image. In some implementations, local contrast is preserved by applying a global tone mapping gains selected based on the low-frequency component image both to pixels of the low-frequency component image (e.g., a base layer) and to pixels of the high-frequency component image (e.g., details).

Details and/or contrast may be enhanced in both a physical domain (e.g., before application of a gamma curve) and in a perceptual domain (e.g., after application of a gamma curve). Such a double enhancement may improve contrast and/or image quality. For example, a first enhancement may be performed before application of a gamma curve (e.g., in a physical space in which a pixel value is proportional to the photons received by the photosite) by weighting a high frequency component image more heavily than a low frequency component image. For example, a second enhancement may be performed after application of a gamma curve (e.g., in a perceptual space in which a human eye may perceive the contrast) by weighting a high frequency component perceptual domain image more heavily than a low frequency component perceptual domain image.

In some implementations, a single bilateral filter may be applied once determine the low-frequency component images (e.g., base layers) in both the physical domain and the perceptual domain. This may be accomplished by using an approximation that the gamma curve mapping commutes with the bilateral filter operation. Application of a bilateral filter uses a significant portion of the computing resources (e.g., memory and processor cycles) used for local tone mapping. Reusing the result of a single application of the bilateral filter in both domains may yield substantial saving in terms of implementation efficiency. In some implementations, the low-frequency component image (e.g., a base layer) is determined by applying a bilateral filter before application of a gamma curve and global tone mapping, then the low-frequency component perceptual domain image is determined by applying the gamma curve and global tone mapping to the low-frequency component image.

To reduced computing resource consumption, a bilateral filter may be applied at a lower resolution than the incoming image resolution. For example, the window of a bilateral filter used for determining a low-frequency component image (e.g., a base layer) may be a 300×300 pixel block. A significant cost of implementing this bilateral filter is a 300 lines buffer used to have access to this window (e.g., a pixel neighborhood) during processing. To reduce this cost, a low resolution window or neighborhood (e.g., one value for each 8×8 pixels) may be used, reducing this memory buffer size by a factor of 64. Candidate values for the bilateral filter may also be selected from this low resolution image, which means that the number of candidates is also divided by 64, which also may reduce the number of processor cycles used. This approach may facilitate implementation in an embedded solution. In some implementations, application of a bilateral filter includes processing all candidate values up to a certain maximum distance from a pixel under consideration (e.g., at the center of the window/neighborhood). In some implementations, similar results may be obtained by considering a smaller subset of these candidates (e.g., around 30% of the candidates), reducing the consumption of computing resources. For example, all candidates up to a certain first distance may be processed, then 50% of candidates between the first distance and a second distance, then 25% of candidates between the second distance and a third distance.

The implementation of local tone mapping is not without its own pitfalls. Applying local tone mapping to an image that contains one or more faces results in an enhanced image where the contrast in the one or more faces is overcompensated resulting in an undesirable image. Similarly, when applying local tone mapping to an image that contains a blue sky, the resulting enhanced image contains an undesirable sky where the contrast of the sky is overcompensated.

Implementations are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIGS. 1A-1D illustrate an embodiment of an example image capture device 100 that may include an audio system for use in a submersible camera system. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video, and to store captured images and video for subsequent display or playback.

The image capture device 100 can include various indicators, including the LED lights 106 and the LED display 108. The image capture device 100 can also include buttons 110 configured to allow a user of the image capture device 100 to interact with the image capture device 100, to turn the image capture device 100 on, and to otherwise configure the operating mode of the image capture device 100. The image capture device 100 can also include a microphone 112 configured to receive and record audio signals in conjunction with recording video. The side of the image capture device 100 may include an I/O interface 114. The camera may also include a microphone 116 system integrated into the camera housing. The front surface of the camera may include two drainage ports as part of a drainage channel 118 for the camera audio system. The camera can include an interactive display 120 that allows for interaction with the camera while simultaneously displaying camera information on a surface of the camera. As illustrated, the image capture device 100 may include a lens 104 configured to receive light incident upon the lens and to direct received light onto an image sensor internal to the lens.

The image capture device 100, includes a camera exterior that encompasses and protects the camera's internal electronics, which are further described in later sections. The camera exterior includes 6 surfaces (i.e. a front face, a left face, a right face, a back face, a top face, and a bottom face), wherein the exterior surfaces form a rectangular cuboid.

Furthermore, both the front and rear surfaces of the image capture device 100 are substantially rectangular in shape. The image capture device 100 can be made of a rigid material such as plastic, aluminum, steel, or fiberglass. Additional camera features, such as the features described above, may be affixed to an exterior of the camera. In some embodiments, the camera described herein includes features other than those described below. For example, instead of a single interface button, the camera can include additional buttons or different interface features, such as multiple microphone openings to receive voice or other audio commands.

Although not expressly shown in FIGS. 1A-1D, in some implementations, the image capture devices 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, in some implementations, the image capture device 100 may include one or more microphones, which may receive, capture, and record audio information, which may be associated with images acquired by the image sensors.

Although not expressly shown in FIG. 1, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture device 100 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture device 100 via the computing communication link 160, or receive user input and communicate information with the image capture device 100 via the computing communication link 160.

In some implementations, the image capture device 100 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture device 100. For example, a display of the user interface device 120 may be a viewport into the three-dimensional space represented by the panoramic images or video captured or created by the image capture device 100.

In some implementations, the user interface device 120 may communicate information, such as metadata, to the image capture device 100. For example, the user interface device 120 may send orientation information of the user interface device 120 with respect to a defined coordinate system to the image capture device 100, such that the image capture device 100 may determine an orientation of the user interface device 120 relative to the image capture device 100. Based on the determined orientation, the image capture device 100 may identify a portion of the panoramic images or video captured by the image capture device 100 for the image capture device 100 to send to the user interface device 120 for presentation as the viewport. In some implementations, based on the determined orientation, the image capture device 100 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture device 100 using a communication interface such as the computing communication link 160. The image capture device 100 may provide an encoded bitstream to enable viewing of a portion of the panoramic content corresponding to a portion of the environment of the display location as the image capture device 100 traverses the path 122. Accordingly, display orientation information from the user interface device 120 may be transmitted to the image capture device 100 to control user selectable viewing of captured images and/or video.

In some implementations, the image capture device 100 may communicate with one or more other external devices (not shown) via wired or wireless computing communication links (not shown).

In some implementations, data, such as image data, audio data, and/or other data, obtained by the image capture device 100 may be incorporated into a combined multimedia stream. For example, the multimedia stream may include a video track and/or an audio track. As another example, information from various metadata sensors and/or sources within and/or coupled to the image capture device 100 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications to manage or control the image capture device 100. For example, the user interface device 120 may include an application for controlling camera configuration, video acquisition, video display, or any other configurable or controllable aspect of the image capture device 100.

In some implementations, the user interface device 120, such as via an application, may generate and share, such as via a cloud-based or social media service, one or more images, or short video clips, such as in response to user input. In some implementations, the user interface device 120, such as via an application, may remotely control the image capture device 100, such as in response to user input.

In some implementations, the user interface device 120, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device 120, such as via an application, may mark one or more key moments contemporaneously with capturing the images or video by the image capture device 100, such as with a tag, such as in response to user input.

In some implementations, the user interface device 120, such as via an application, may display, or otherwise present, marks or tags associated with images or video, such as in response to user input. For example, marks may be presented in a camera roll application for location review and/or playback of video highlights.

In some implementations, the user interface device 120, such as via an application, may wirelessly control camera software, hardware, or both. For example, the user interface device 120 may include a web-based graphical interface accessible by a user for selecting a live or previously recorded video stream from the image capture device 100 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2B:
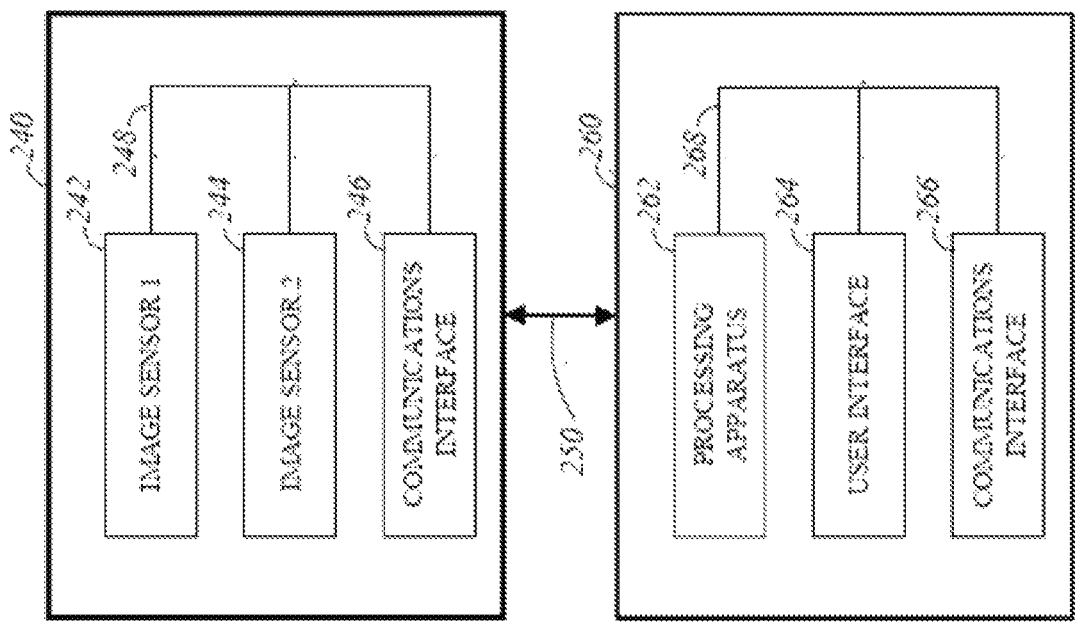
FIG. 2B is a block diagram of an example of a system configured for image capture and object detection-based local tone mapping.
Figure 2A:
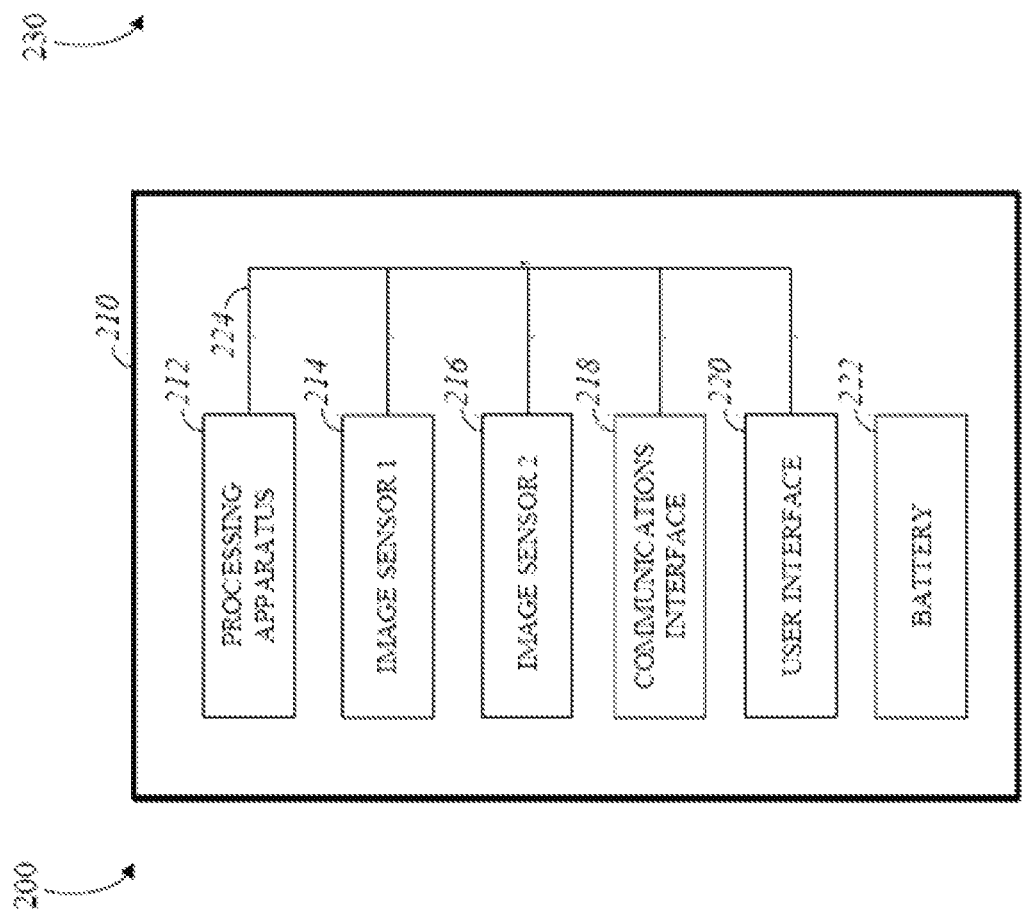
FIG. 2A is a block diagram of an example of an image capture device configured for object detection-based local tone mapping.

FIG. 2A is a block diagram of an example of a system 200 configured for image capture and object detection-based local tone mapping. The system 200 includes an image capture device 210 (e.g., a camera or a drone). The image capture device 210 includes one or more image sensors, for example, a first image sensor 214 and a second image sensor 216. In this example, the image capture device 210 includes a processing apparatus 212 that is configured to receive a first image from the first image sensor 214 and receive a second image from the second image sensor 216. The processing apparatus 212 may be configured to perform image signal processing (e.g., filtering, object detecting, tone mapping, stitching, and/or encoding) to generate output images based on image data from the image sensors 214 and 216. The image capture device 210 includes a communications interface 218 for transferring images to other devices. The image capture device 210 includes a user interface 220, which may allow a user to control image capture functions and/or view images. The image capture device 210 includes a battery 222 for powering the image capture device 210. The components of the image capture device 210 may communicate with each other via the bus 224. The system 200 may be used to implement methods described in this disclosure, such as the method 300 of FIG. 3, the method 400 of FIG. 4, the method 500 of FIG. 5, or the method 600 of FIG. 6.

The processing apparatus 212 may include one or more processors having single or multiple processing cores. The processing apparatus 212 may include memory, such as random access memory device (RAM), flash memory, or any other suitable type of storage device such as a non-transitory computer readable memory. The memory of the processing apparatus 212 may include executable instructions and data that can be accessed by one or more processors of the processing apparatus 212. For example, the processing apparatus 212 may include one or more DRAM modules such as double data rate synchronous dynamic random-access memory (DDR SDRAM). In some implementations, the processing apparatus 212 may include a digital signal processor (DSP). In some implementations, the processing apparatus 212 may include an application specific integrated circuit (ASIC). For example, the processing apparatus 212 may include a custom image signal processor.

The first image sensor 214 and the second image sensor 216 are configured to detect light of a certain spectrum (e.g., the visible spectrum or the infrared spectrum) and convey information constituting an image as electrical signals (e.g., analog or digital signals). For example, the image sensors 214 and 216 may include charge-coupled devices (CCD) or active pixel sensors in complementary metal-oxide-semiconductor (CMOS). The image sensors 214 and 216 may detect light incident through respective lens (e.g., a fisheye lens). In some implementations, the image sensors 214 and 216 include digital to analog converters. In some implementations, the image sensors 214 and 216 are held in a fixed orientation with respective fields of view that overlap.

The image capture device 210 may include a communications interface 218, which may enable communications with a personal computing device (e.g., a smartphone, a tablet, a laptop computer, or a desktop computer). For example, the communications interface 218 may be used to receive commands controlling image capture and processing in the image capture device 210. For example, the communications interface 218 may be used to transfer image data to a personal computing device. For example, the communications interface 218 may include a wired interface, such as a high-definition multimedia interface (HDMI), a universal serial bus (USB) interface, or a FireWire interface. For example, the communications interface 218 may include a wireless interface, such as a Bluetooth interface, a ZigBee interface, and/or a Wi-Fi interface.

The image capture device 210 may include a user interface 220. For example, the user interface 220 may include an LCD display for presenting images and/or messages to a user. For example, the user interface 220 may include a button or switch enabling a person to manually turn the image capture device 210 on and off. For example, the user interface 220 may include a shutter button for snapping pictures.

The image capture device 210 may include a battery 222 that powers the image capture device 210 and/or its peripherals. For example, the battery 222 may be charged wirelessly or through a micro-USB interface.

FIG. 2B is a block diagram of an example of a system 230 configured for image capture and object detection-based local tone mapping. The system 230 includes an image capture device 240 and a personal computing device 260 that communicate via a communications link 250. The image capture device 240 may include any number of image sensors, for example, the image capture device 240 in FIG. 2B includes a first image sensor 242 and a second image sensor 244 that are configured to capture respective images. The image capture device 240 includes a communications interface 246 configured to transfer images via the communication link 250 to the personal computing device 260. The personal computing device 260 includes a processing apparatus 262 that is configured to receive, using the communications interface 266, a first image from the first image sensor, and receive a second image from the second image sensor 244. The processing apparatus 262 may be configured to perform image signal processing (e.g., filtering, tone mapping, stitching, and/or encoding) to generate output images based on image data from the image sensors 242 and 244. The system 230 may be used to implement methods described in this disclosure, such as the method 300 of FIG. 3, the method 400 of FIG. 4, or the method 500 of FIG. 5.

The first image sensor 242 and the second image sensor 244 are configured to detect light of a certain spectrum (e.g., the visible spectrum or the infrared spectrum) and convey information constituting an image as electrical signals (e.g., analog or digital signals). For example, the image sensors 242 and 244 may include charge-coupled devices (CCD) or active pixel sensors in complementary metal-oxide-semiconductor (CMOS). The image sensors 242 and 244 may detect light incident through respective lens (e.g., a fisheye lens). In some implementations, the image sensors 242 and 244 include digital to analog converters. In some implementations, the image sensors 242 and 244 are held in a fixed relative orientation with respective fields of view that overlap. Image signals from the image sensors 242 and 244 may be passed to other components of the image capture device 240 via the bus 248.

The communications link 250 may be a wired communications link or a wireless communications link. The communications interface 246 and the communications interface 266 may enable communications over the communications link 250. For example, the communications interface 246 and the communications interface 266 may include a high-definition multimedia interface (HDMI), a universal serial bus (USB) interface, a FireWire interface, a Bluetooth interface, a ZigBee interface, and/or a Wi-Fi interface. For example, the communications interface 246 and the communications interface 266 may be used to transfer image data from the image capture device 240 to the personal computing device 260 for image signal processing (e.g., filtering, tone mapping, stitching, and/or encoding) to generate output images based on image data from the image sensors 242 and 244.

The processing apparatus 262 may include one or more processors having single or multiple processing cores. The processing apparatus 262 may include memory, such as random access memory device (RAM), flash memory, or any other suitable type of storage device such as a non-transitory computer readable memory. The memory of the processing apparatus 262 may include executable instructions and data that can be accessed by one or more processors of the processing apparatus 262. For example, the processing apparatus 262 may include one or more DRAM modules such as double data rate synchronous dynamic random-access memory (DDR SDRAM). In some implementations, the processing apparatus 262 may include a digital signal processor (DSP). In some implementations, the processing apparatus 262 may include an application specific integrated circuit (ASIC). For example, the processing apparatus 262 may include a custom image signal processor. The processing apparatus 262 may exchange data (e.g., image data) with other components of the personal computing device 260 via the bus 268.

The personal computing device 260 may include a user interface 264. For example, the user interface 264 may include a touchscreen display for presenting images and/or messages to a user and receiving commands from a user. For example, the user interface 264 may include a button or switch enabling a person to manually turn the personal computing device 260 on and off In some implementations, commands (e.g., start recording video, stop recording video, or snap photograph) received via the user interface 264 may be passed on to the image capture device 240 via the communications link 250.

Global tone mapping can be applied as a variable gain that is applied on the linear RGB vales according to their luminance in order to have a better repartition of the information on the output range. This gain may depend on the input histogram of luminance values and a target histogram that has to be matched (e.g., a flat histogram to equalize the image or a Gaussian histogram to have a better enhancement of shadows/highlights). Consider a pixel value $x_n=[R,G,B]^T$. A global tone mapping gain $\lambda(\ )$ may be applied as follows: $\acute{x}_n=\lambda(Y(x_n))*x_n$ where $\acute{x}_n$ is a global tone mapped pixel value and $Y(x)$ is a discrete approximation of the luminance defined by a linear combination of the R, G and B channels.

Global tone mapping can be a good approach to increase the entropy or to match a given histogram of pixel luminance but doesn't take into account the spatial repartition of the image data. Indeed, two images can have the exact same histogram but can represent either a smooth gradient or a noisy image. A goal of the global tone mapping is to widen the ranges of the input dynamic range that represent more information of the image at the expense of a compression in the range(s) of luminance values of that represent less information. This leads to a loss of contrast in some areas of the image. A resulting loss of contrast may not be that important if the compressed information is not gathered at the same location in the image, but when compressed information is spatially concentrated, it can lead to unnatural and/or low quality rendering of the image. In order to preserve or enhance some of the details that may be lost using global tone mapping only, spatial information may be introduced, which may enable keeping the contrast in these areas. A local tone mapping may help to reach this goal.

For example, a process for local tone mapping may include: separating the low and high frequencies of the input image in order to preserve the high frequency contrast and to compress low frequency transitions. Some inexpensive (in terms of computing resources) local tone mapping approaches are based on unsharp mask methods, which may introduce halos. In order to have strong local tone mapping on high dynamic range images, halos may be suppressed by using an edge-aware filtering (e.g., a bilateral filter). High and low frequency components of an image may then be recombined to achieve preservation and/or amplification of the details.

Another problem of local tone mapping is overcompensation in faces and blue skies in the resulting enhanced image. In accordance with implementations of this disclosure, object detection may be performed, and local tone mapping may be performed based on a classification of the objects detected and applied to areas of the image that do not contain faces, blue skies, or both.

Figure 3:
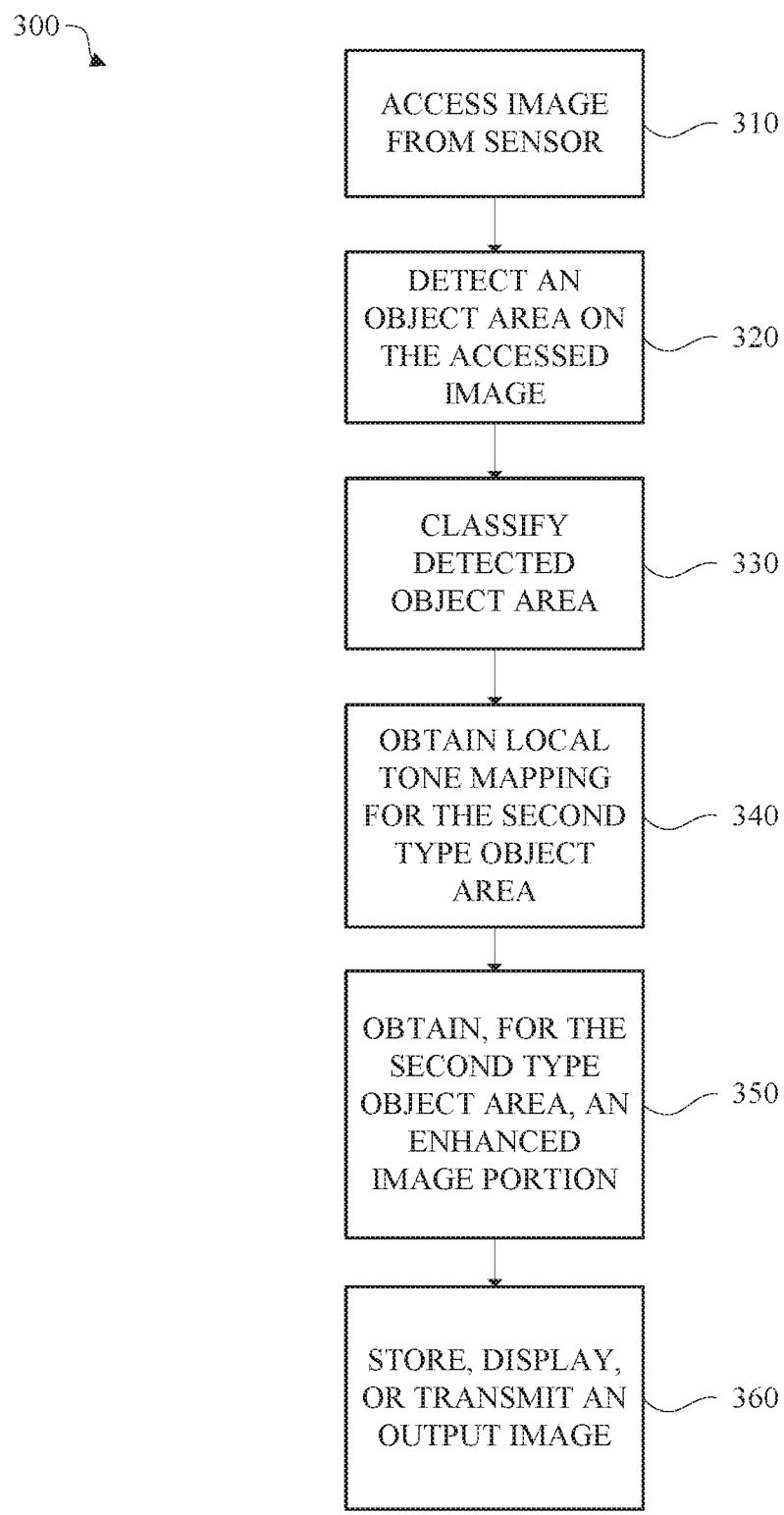
FIG. 3 is a flowchart of an example of a method for object detection-based local tone mapping of a captured image.

FIG. 3 is a flowchart of an example method 300 for object detection-based local tone mapping of a captured image. The method 300 includes accessing 310 the image from an image sensor; detecting 320 an object area on the accessed image; classifying 330 the detected object area; obtaining 340 a local tone mapping; obtaining 350 an enhanced image portion; and storing, displaying, or transmitting 360 an output image based on the enhanced image portion. For example, the method 300 may be implemented by the system 200 of FIG. 2A or the system 230 of FIG. 2B. For example, the method 400 may be implemented by an image capture device, such the image capture device 210 shown in FIG. 2, or an image capture apparatus, such as the image capture apparatus 110 shown in FIG. 1. For example, the method 300 may be implemented by a personal computing device, such as the personal computing device 260.

The method 300 includes accessing 310 the image from the image sensor. The image sensor may be part of an image capture apparatus (e.g., the image capture apparatus 110, the image capture device 210, or the image capture device 240). In some implementations, the image sensor may be attached to a processing apparatus that implements the method 300. For example, the image may be accessed 310 from the image sensor via a bus (e.g., the bus 224). In some implementations, the image may be accessed 310 via a communications link (e.g., the communications link 250). For example, the image may be accessed 310 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be accessed 410 via communications interface 266. For example, the image may be accessed 310 as an input image signal, which may represent each pixel value in a defined format, such as in a RAW image format. In some implementations, the image may be frame of video, i.e., one of a sequence of images of a video. In some implementations, the image is accessed 310 directly from the image sensor without intermediate image processing. In some implementations, the image is accessed 310 after being subjected to intermediate image processing (e.g., correction of dead pixels, band processing, decoupling of vertical blanking, spatial noise reduction, and/or temporal noise reduction).

The method 300 includes detecting 320 an object area on the image and classifying 330 the detected object areas. For example, each detected object area may be classified into a first object area or a second object area. The first and second object areas are discussed for simplicity, and any number of object areas may be detected and classified. In some implementations, the first object area may include image areas that include one or more human faces, a blue sky, or any other object where local tone mapping contrast enhancement is undesirable. The second object area may include any other objects that are not classified as the first object areas. For example, the second object area excludes image areas with faces, blue skies, or objects where local tone mapping contrast is undesirable. A single image may include any number of first object areas, second object areas, or both.

The method 300 includes obtaining 340 a local tone mapping. The local tone mapping may be obtained for the second type object areas of the image, while local tone mapping is not performed on the first type object areas of the image. In some implementations, obtaining 340 the local tone mapping may include applying a bilateral filter to the second type object area of the image to obtain a low-frequency component image portion and a high-frequency component image portion. In some examples, obtaining 340 the local tone mapping may include obtaining, for the second type object area, a second enhanced image portion based on a weighted sum of the low-frequency component image portion and the high-frequency component image portion, wherein the high-frequency component image portion is weighted more than the low-frequency component image portion. Obtaining 340 the local tone mapping may include obtaining, for the second type object area, a third enhanced image portion based on the second enhanced image portion and a tone mapping. Obtaining 340 the local tone mapping may include obtaining, for the second type object area, a perceptual domain image portion based on the third enhanced image portion and a gamma curve that models human perception of contrast. Obtaining 340 the local tone mapping may include obtaining, for the second type object area, a low-frequency component perceptual domain image portion and a high-frequency component perceptual domain image portion as components of the perceptual domain image portion. Obtaining 340 the local tone mapping may include obtaining, for the second type object area, a fourth enhanced image portion based on a weighted sum of the low-frequency component perceptual domain image portion and the high-frequency component perceptual domain image portion, wherein the high-frequency component perceptual domain image portion is weighted more than the low-frequency component perceptual domain image portion.

The method 300 includes obtaining 350, for the second type object areas of the image, an enhanced image portion. The enhanced image portion may be based on the local tone mapping. The method 300 includes storing, displaying, or transmitting 360 an output image based on the enhanced image portion and the first type object areas. In some implementations, the output image is the enhanced image portion. In some implementations, the enhanced image portion may by subject to additional image processing (e.g., perceptual tone mapping with a gamma curve γ( ) lens distortion correction, electronic rolling shutter correction, stitching with parallax correction and blending to combine images from multiple image sensors, electronic image stabilization, and/or output projection) to determine the output image. For example, the output image may be transmitted 470 to an external device (e.g., a personal computing device) for display or storage. For example, the output image may be stored 360 in memory of a processing apparatus (e.g., the processing apparatus 212 or the processing apparatus 262). For example, the output image may be displayed 360 in the user interface 220 or in the user interface 264. For example, the output image may be transmitted 360 via the communications interface 218.

Once the separation between the high and low frequencies in an image has been performed, it is possible to take advantage of this not only to preserve the contrast but also to perform extra contrast or detail enhancement. Tone mapping operations may be applied in different domains: (1) to an image represented in a physical domain, once we have all the information about the real color of the scene; or (2) to an image represented in a perceptual domain, after a gamma curve γ( ) has been applied to compensate for the eye contrast response non-uniformity. In the physical domain a pixel value may be proportional to the number of photons received by the sensor. Local contrast enhancement in the physical domain may lead to more natural and plausible scenes but may lack contrast in the highlights due to the compression performed by when a gamma curve is later applied. In the perceptual domain however, the same amplification may be performed on both the shadows and the highlights independently of the gamma curve compression. When well-tuned, local contrast enhancement in the perceptual domain can lead to punchier images but may look more like an unnatural high dynamic range contrast enhancement when stronger. To balance these concerns, local tone mapping operations may be applied in both the physical domain and in the perceptual domain.

Figure 4:
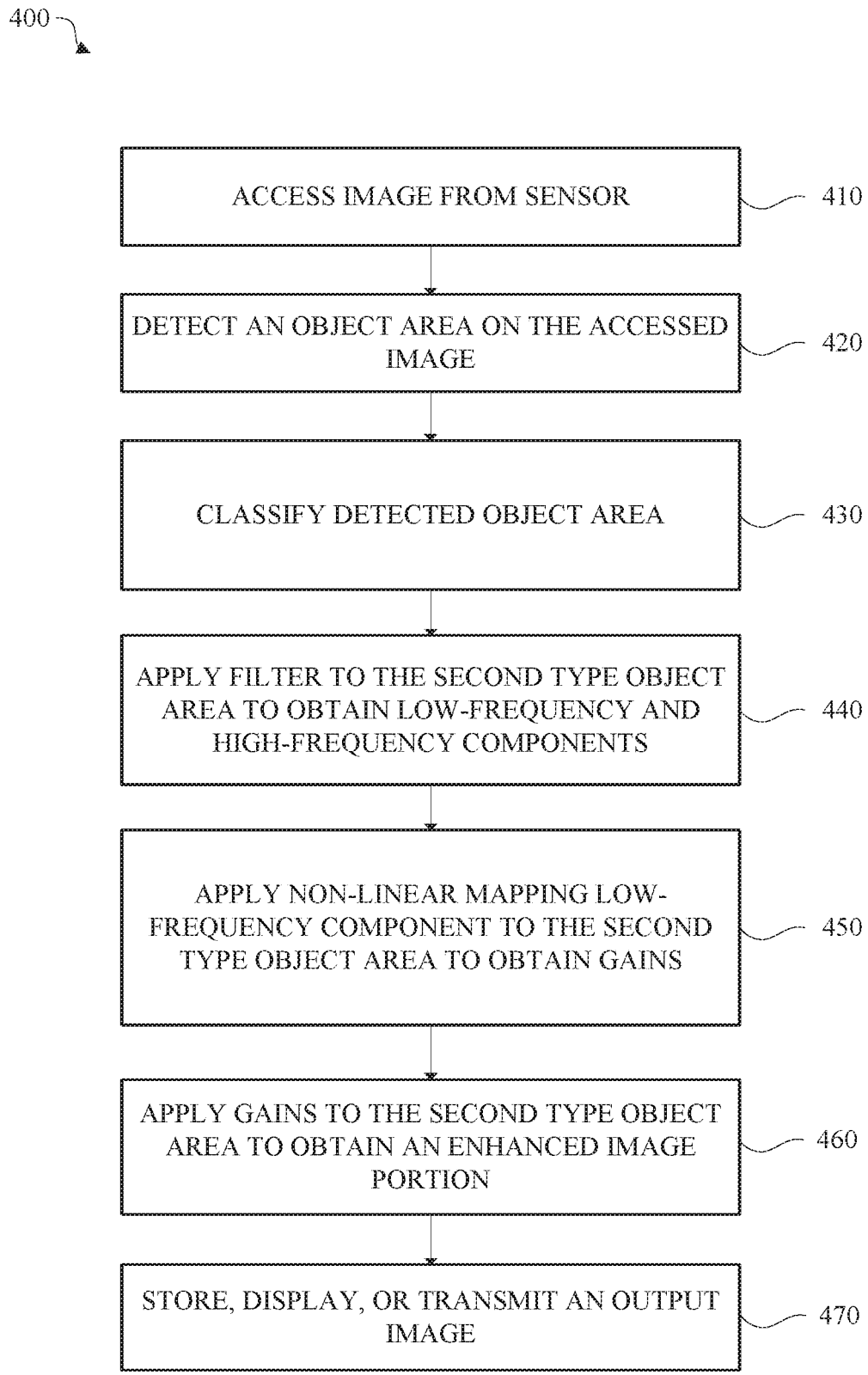
FIG. 4 is a flowchart of another example of a method for object detection-based local tone mapping of a captured image.

FIG. 4 is a flowchart of another example method 400 for object detection-based local tone mapping of a captured image. The method 400 includes accessing 410 the image from an image sensor; detecting 420 an object area on the accessed image; classifying 430 the detected object area; applying 440 a filter to an object area to obtain a low-frequency component image portion and a high-frequency component image portion; applying 450 a non-linear mapping to the low-frequency component image portion to obtain gains for respective image portions; applying 460 the gains for respective image portions to corresponding image portions of the object area to obtain an enhanced image; and storing, displaying, or transmitting 470 an output image based on the enhanced image. For example, the method 400 may be implemented by the system 200 of FIG. 2A or the system 230 of FIG. 2B. For example, the method 400 may be implemented by an image capture device, such the image capture device 210 shown in FIG. 2, or an image capture apparatus, such as the image capture apparatus 110 shown in FIG. 1. For example, the method 400 may be implemented by a personal computing device, such as the personal computing device 260.

The method 400 includes accessing 410 the image from the image sensor. The image sensor may be part of an image capture apparatus (e.g., the image capture apparatus 110, the image capture device 210, or the image capture device 240). In some implementations, the image sensor may be attached to a processing apparatus that implements the method 400. For example, the image may be accessed 410 from the image sensor via a bus (e.g., the bus 224). In some implementations, the image may be accessed 410 via a communications link (e.g., the communications link 250). For example, the image may be accessed 410 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be accessed 410 via communications interface 266. For example, the image may be accessed 410 as an input image signal, which may represent each pixel value in a defined format, such as in a RAW image format. In some implementations, the image may be frame of video, i.e., one of a sequence of images of a video. In some implementations, the image is accessed 410 directly from the image sensor without intermediate image processing. In some implementations, the image is accessed 410 after being subjected to intermediate image processing (e.g., correction of dead pixels, band processing, decoupling of vertical blanking, spatial noise reduction, and/or temporal noise reduction).

The method 400 includes detecting 420 an object area on the image and classifying 430 the detected object areas. For example, each detected object area may be classified into a first object area or a second object area. The first and second object areas are discussed for simplicity, and any number of object areas may be detected and classified. In some implementations, the first object area may include image areas that include one or more human faces, a blue sky, or any other object where local tone mapping contrast enhancement is undesirable. The second object area may include any other objects that are not classified as the first object areas. For example, the second object area excludes image areas with faces, blue skies, or objects where local tone mapping contrast is undesirable. A single image may include any number of first object areas, second object areas, or both.

The method 400 includes applying 440 a filter to an object area to obtain a low-frequency component image portion and a high-frequency component image portion. The filter may include a low-pass filter. In some implementations, the filter may include a Guassian blur. In some implementations, the filter may include a bilateral filter. For example, a bilateral filter may be defined as follows. Consider a pixel value $x_n$ of a pixel at position $p_n$ from the image in a linear space RGB format (e.g., a luminance value $Y(x_n)$ may be determined as a linear combination of RGB channel values for the pixel). A cross-bilateral filter may be applied on x guided by $\gamma(Y(x))$ where $\gamma(\ )$ is the gamma curve that will later be applied on the image. A goal of this gamma curve is to be able to filter the contrast in a perceptual space.

$$\bar{x}_n = \frac{1}{N\_\Omega} \sum_{p_k in \Omega(p_n)} [x_k w\_s(p_k, p_n) w\_r(\gamma(Y(x_k)), \gamma(Y(x_n)))]$$ Equation 1

$$N\_\Omega = \sum_{p_k in \Omega(p_n)} [w\_s(p_k, p_n) w\_r(\gamma(Y(x_k)), \gamma(Y(x_n)))]$$

where $\bar{x}$ is a low-frequency component image (e.g., a base layer); $\Omega(p_n)$ is a window of pixels around the position $p_n$; $w\_s(\ )$ is a spatial Gaussian weighting function centered on $p_n$ and specified by $\sigma\_s$ (e.g., $\sigma\_s$ may be chosen to be approximately 50 for a 12 mega-pixel image and a radius of $r=3*\sigma\_s$ may be used for the spatial Gaussian weighting function); and $w\_r(\ )$ is a similarity function based on the difference of intensity between $\gamma(Y(x_k))$ and $\gamma(Y(x_0))$ defined as:

$$w\_r(u, v) = \frac{1}{\varepsilon^\rho} \text{ if } |u - v| < \varepsilon$$

$$w\_r(u, v) = \frac{1}{|u - v|^\rho} \text{ otherwise}$$

For example, the constant $\rho$ may be set to 1.5 the constant $\varepsilon$ may be set to 0.05. In some implementations, the high-frequency component image is determined as a compliment of the low-frequency component image (e.g., as $(x-\bar{x})$).

In some implementations, the computing resources (e.g., memory and/or processor cycles) consumed to apply 440 the filter may be reduced using approximations or other methods to reduce complexity. For example, where the filter includes a bilateral filter, a reduced resolution image (e.g., a bin 8 image) may be determined based on the image that is at a lower resolution than the image, and applying the bilateral filter may include processing pixels of the reduced resolution image as candidates (i.e., pixels within the window $\Omega(p_n)$ of the bilateral filter). For example, where a bin 8 image is used for the bilateral filter rather than a full resolution image the number of candidates processed by the bilateral filter may be reduced by a factor of approximately 64. In some implementations, an anti-alias Guassian filter (e.g., $\sigma=8$ pixels) may be applied prior to subsampling to determine the reduced resolution image. Applying 440 a bilateral filter may include subsampling candidates within a range of distances from a kernel center. The subsampling of candidates may be implemented with a sparse kernel or window $\Omega(p_n)$ for the bilateral filter. For example, applying 440 a bilateral filter may include subsampling candidates at a first subsampling factor within a first range of distances from a kernel center, and subsampling candidates at a second subsampling factor within a second range of distances from the kernel center. Filter weights of a sparse bilateral filter may be modified in order to mitigate changes in the filtering strength relative to a full resolution bilateral filter (e.g., the bilateral filter of Equation 1). An interpolation may be used to interpolate the candidates according to the position of the current pixel and to have a smooth continuous output.

In order to preserve details, a goal may be to apply the same gain to all pixels belonging to the same object. Toward this end, a global tone mapping gain may be driven by the low-frequency component image: $\acute{x}_n = \lambda(\bar{x}_n)x_n$, which can be rewritten as $\acute{x}_n = \lambda(\bar{x}_n)(\bar{x}_n + (x_n - \bar{x}_n))$. From there, it can be deduced that the values of the low frequencies and high frequencies of the output image respectively are $\bar{x}_n = \lambda(\bar{x}_n)\bar{x}_n$ and $\acute{x}_n - \bar{x}_n = \lambda(\bar{x}_n)(x_n - \bar{x}_n)$. In this expression, we can see that the gain is driven by the low-frequency component image (e.g., a local mean of the image pixel values), but is applied both to the low frequencies $\bar{x}_n$ and to the high frequencies $(x_n - \bar{x}_n)$. Therefore the details may be enhanced the same ways as the mean. This approach may serve to preserve local contrast and preserve the details that would have been either amplified or compressed if the global tone mapping was applied without modification to account for local variation.

The method 400 includes applying 450 a non-linear mapping to the low-frequency component image portion to the second type object area to obtain gains for respective image portions (e.g., pixels or blocks of pixels). For example, the tone curve $\lambda(\ )$ may be applied to the low-frequency component image to determine gains for respective image portions. In some implementations, the non-linear mapping is determined based on a histogram analysis of image portions of the of the low-frequency component image. For example, the tone curve $\lambda(\ )$ may be determined based on a histogram of values in the low-frequency component image $\bar{x}$. For example, the tone curve $\lambda(\ )$ may be determined to achieve a target histogram or distribution of luminance values for a resulting output image (e.g., to equalize the histogram of the low-frequency component image).

The method 400 includes applying 460 the gains for respective image portions (e.g., pixels or blocks of pixels) to corresponding image portions of the second type object area to obtain an enhanced image portion. The gains may be applied 440 by multiplying the gains with corresponding pixel values of the image. For example, the obtained gains $\lambda(\bar{x}_n)$ may be applied 460 according to $\acute{x}_n = \lambda(\bar{x}_n)x_n$, where $\acute{x}$ is a tone mapped enhanced image.

The method 400 includes storing, displaying, or transmitting 470 an output image based on the enhanced image and the first type object area. In some implementations, the output image is the enhanced image. In some implementations, the enhanced image may by subject to additional image processing (e.g., perceptual tone mapping with a gamma curve $\gamma(\ )$, lens distortion correction, electronic rolling shutter correction, stitching with parallax correction and blending to combine images from multiple image sensors, electronic image stabilization, and/or output projection) to determine the output image. For example, the output image may be transmitted 470 to an external device (e.g., a personal computing device) for display or storage. For example, the output image may be stored 470 in memory of a processing apparatus (e.g., the processing apparatus 212 or the processing apparatus 262). For example, the output image may be displayed 470 in the user interface 220 or in the user interface 264. For example, the output image may be transmitted 470 via the communications interface 218.

Once the separation between the high and low frequencies in an image has been performed, it is possible to take advantage of this not only to preserve the contrast but also to perform extra contrast or detail enhancement. Tone mapping operations may be applied in different domains: (1) to an image represented in a physical domain, once we have all the information about the real color of the scene; or (2) to an image represented in a perceptual domain, after a gamma curve $\gamma(\ )$ has been applied to compensate for the eye contrast response non-uniformity. In the physical domain a pixel value may be proportional to the number of photons received by the sensor. Local contrast enhancement in the physical domain may lead to more natural and plausible scenes but may lack contrast in the highlights due to the compression performed by when a gamma curve is later applied. In the perceptual domain however, the same amplification may be performed on both the shadows and the highlights independently of the gamma curve compression. When well-tuned, local contrast enhancement in the perceptual domain can lead to punchier images but may look more like an unnatural high dynamic range contrast enhancement when stronger. To balance these concerns, local tone mapping operations may be applied in both the physical domain and in the perceptual domain.

Figure 5:
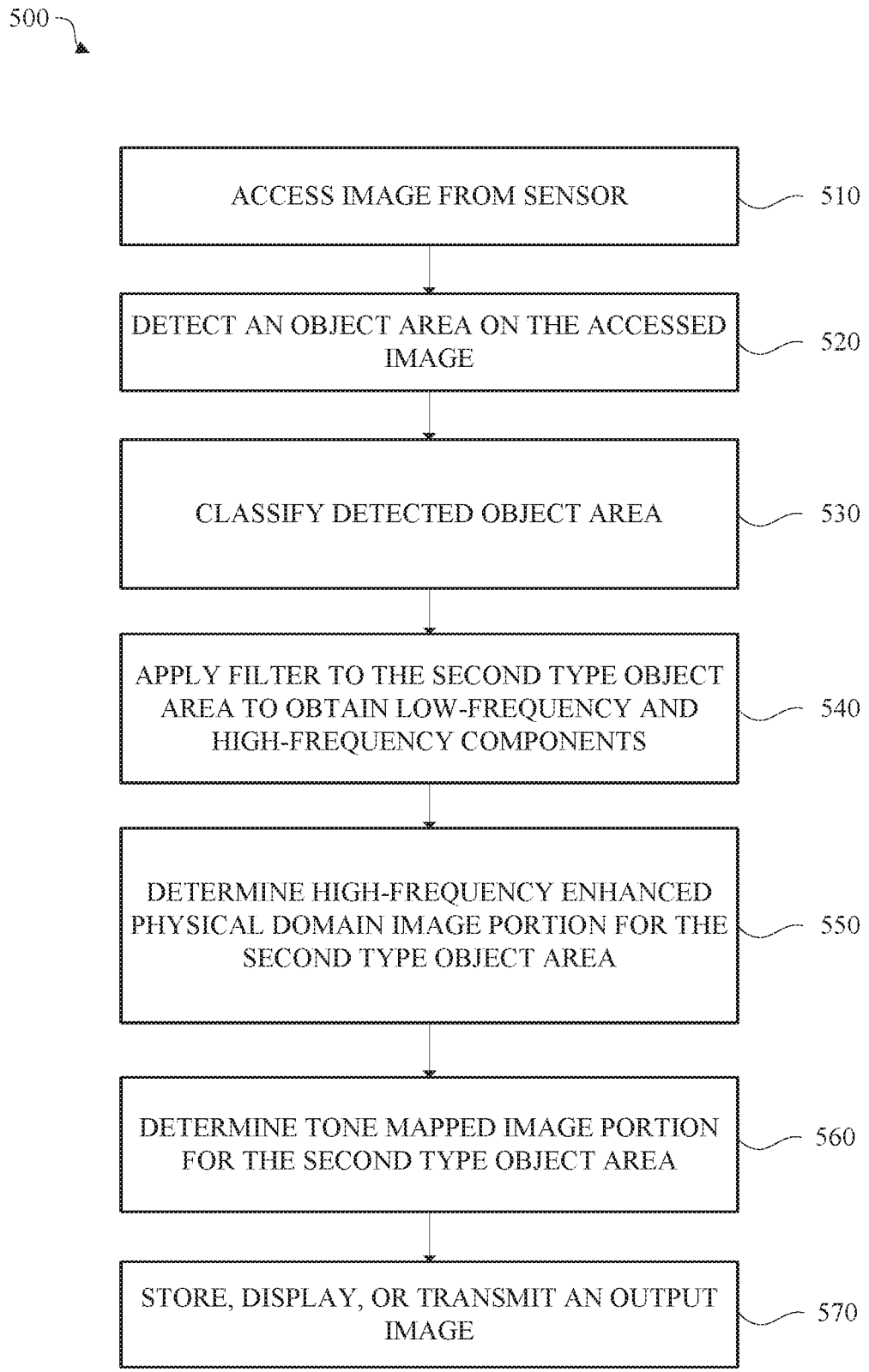
FIG. 5 is a flowchart of another example of a method for object detection-based local tone mapping of a captured image.

FIG. 5 is a flowchart of an example method 500 for local tone mapping of a captured image. The method 500 includes accessing 510 an image from an image sensor; detecting 520 an object area on the accessed image; classifying 530 the detected object area; applying 540 a filter to an object area to obtain a low-frequency component image portion and a high-frequency component image portion; determining 550 a first enhanced image portion for the object area based on a weighted sum of the low-frequency component image and the high-frequency component image, where the high-frequency component image is weighted more than the low-frequency component image; determining 560 a second enhanced image portion for the object area based on the first enhanced image and a tone mapping; and storing, displaying, or transmitting 570 an output image based on the second enhanced image. For example, the method 500 may be implemented by the system 200 of FIG. 2A or the system 230 of FIG. 2B. For example, the method 500 may be implemented by an image capture device, such the image capture device 210 shown in FIG. 2, or an image capture apparatus, such as the image capture apparatus 110 shown in FIG. 1. For example, the method 500 may be implemented by a personal computing device, such as the personal computing device 260.

The method 500 includes accessing 510 an image from an image sensor. The image sensor may be part of an image capture apparatus (e.g., the image capture apparatus 110, the image capture device 210, or the image capture device 240). In some implementations, the image sensor may be attached to a processing apparatus that implements the method 500. For example, the image may be received 510 from the image sensor via a bus (e.g., the bus 224). In some implementations, the image may be received 510 via a communications link (e.g., the communications link 250). For example, the image may be received 510 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be accessed 510 via communications interface 266. For example, the image may be accessed 510 as an input image signal, which may represent each pixel value in a defined format, such as in a RAW image format. In some implementations, the image may be frame of video, i.e., one of a sequence of images of a video. In some implementations, the image is accessed 510 directly from the image sensor without intermediate image processing. In some implementations, the image is accessed 510 after being subjected to intermediate image processing (e.g., correction of dead pixels, band processing, decoupling of vertical blanking, spatial noise reduction, and/or temporal noise reduction).

The method 500 includes detecting 520 an object area on the image and classifying 530 the detected object areas. For example, each detected object area may be classified into a first object area or a second object area. The first and second object areas are discussed for simplicity, and any number of object areas may be detected and classified. In some implementations, the first object area may include image areas that include one or more faces, a blue sky, or any other object where local tone mapping contrast enhancement is undesirable. The second object area may include any other objects that are not classified as the first object areas. For example, the second object area excludes image areas with faces, blue skies, or objects where local tone mapping contrast is undesirable. A single image may include any number of first object areas, second object areas, or both.

The method 500 includes applying 540 a filter to the second type object area to obtain a low-frequency component image portion and a high-frequency component image portion. The filter may include a low-pass filter. In some implementations, the filter may include a Guassian blur. In some implementations, the filter may include a bilateral filter. For example, the bilateral filter may be defined by Equation 1 above. In some implementations, the high-frequency component image is determined as a compliment of the low-frequency component image (e.g., as $(x-\bar{x})$).

The method 500 includes determining 550 a first enhanced image for the second type object area based on a weighted sum of the low-frequency component image portion and the high-frequency component image portion, where the high-frequency component image portion is weighted more than the low-frequency component image portion. Local contrast enhancement may be performed by tuning the proportion of details in an enhanced image that is determined as weighted sum of component image portions, including the low-frequency component image portion and the high-frequency component image portion. For example, the first enhanced image may be determined according to:

$$\acute{x}_n = \bar{x}_n + \alpha(x_n - \bar{x}_n)$$

where $\acute{x}$ is the first enhanced image, x is an image represented in a physical domain, and $\alpha > 1$ is a weight chosen to enhance details by weighting the high-frequency component image more heavily.

The method 500 includes determining 560 a second enhanced image for the second type object area based on the first enhanced image and a tone mapping. In some implementations, a global tone mapping, based on a tone curve $\lambda(\ )$, may be applied to the first enhanced image to determine 560 the second enhanced image. For example, the second enhanced image $\acute{x}$ may be determined 560 according to:

$$\acute{x}_n = \lambda(\acute{x}_n)\acute{x}_n$$

In some implementations, a tone mapping that depends on pixels in a local area may be applied to the first enhanced image to determine 560 the second enhanced image. For example, determining the second enhanced image based on the first enhanced image and the tone mapping may include applying the tone mapping to the low-frequency component image to obtain gains for respective image portions; and applying the gains for respective image portions to corresponding image portions of the first enhanced image. For example, the second enhanced image $\acute{x}$ may be determined 560 according to:

$$\acute{x}_n = \lambda(\bar{x}_n)\acute{x}_n$$

For example, the tone curve $\lambda(\ )$ may be determined based on a histogram of values in the low-frequency component image $\bar{x}$. For example, the tone curve $\lambda(\ )$ may be determined to achieve a target histogram or distribution of luminance values for a resulting output image (e.g., to equalize the histogram of the low-frequency component image).

The method 500 includes storing, displaying, or transmitting 570 an output image based on the second enhanced image and the first object area. In some implementations, the output image is the second enhanced image. In some implementations, the second enhanced image may by subject to additional image processing (e.g., perceptual tone mapping with a gamma curve $\gamma(\ )$, lens distortion correction, electronic rolling shutter correction, stitching with parallax correction and blending to combine images from multiple image sensors, electronic image stabilization, and/or output projection) to determine the output image. For example, the output image may be transmitted 570 to an external device (e.g., a personal computing device) for display or storage. For example, the output image may be stored 450 in memory of a processing apparatus (e.g., the processing apparatus 212 or the processing apparatus 262). For example, the output image may be displayed 570 in the user interface 220 or in the user interface 264. For example, the output image may be transmitted 570 via the communications interface 218.

Figure 6:
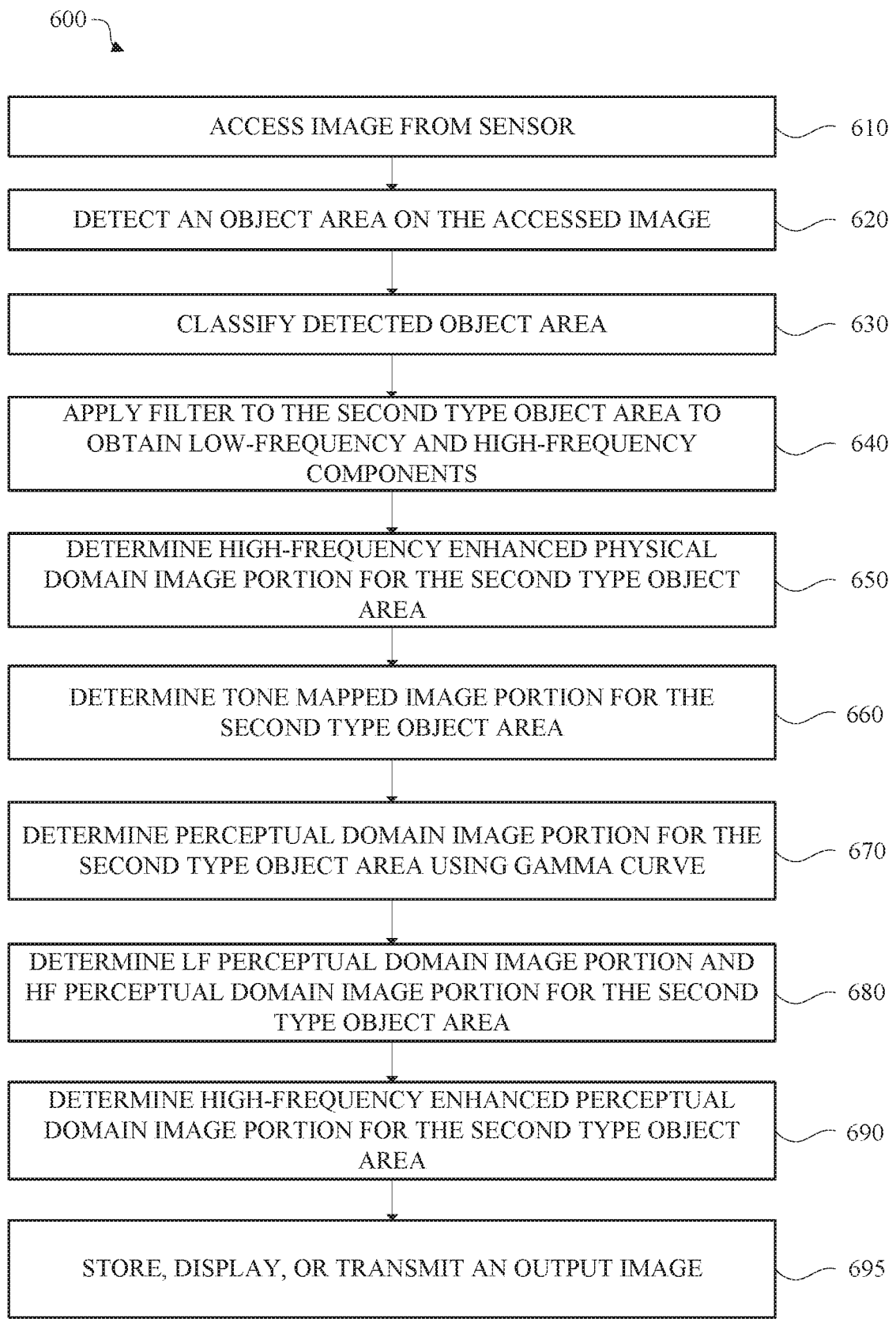
FIG. 6 is a flowchart of another example of a method for object detection-based local tone mapping of a captured image.

FIG. 6 is a flowchart of an example method 600 for local tone mapping of a captured image. The method 600 includes accessing 610 the image from the image sensor; detecting 620 an object area on the accessed image; classifying 630 the detected object area; applying 640 a filter to an object area to obtain a low-frequency component image portion and a high-frequency component image portion; determining 650 a first enhanced image for the image portion based on a weighted sum of the low-frequency component image portion and the high-frequency component image portion, where the high-frequency component image portion is weighted more than the low-frequency component image portion; determining 660 a second enhanced image for the object area based on the first enhanced image and a tone mapping; determining 670 a perceptual domain image portion for the object area based on the second enhanced image and a gamma curve that models human perception of contrast; determining 680 a low-frequency component perceptual domain image portion and a high-frequency component perceptual domain image portion for the object area as components of the perceptual domain image portion; determining 690 a third enhanced image for the object area based on a weighted sum of the low-frequency component perceptual domain image portion and the high-frequency component perceptual domain image portion, where the high-frequency component perceptual domain image portion is weighted more than the low-frequency component perceptual domain image portion; and storing, displaying, or transmitting 695 an output image based on the third enhanced image. For example, the method 600 may be implemented by the system 200 of FIG. 2A or the system 230 of FIG. 2B. For example, the method 600 may be implemented by an image capture device, such the image capture device 210 shown in FIG. 2, or an image capture apparatus, such as the image capture apparatus 110 shown in FIG. 1. For example, the method 600 may be implemented by a personal computing device, such as the personal computing device 260.

The method 600 includes accessing 610 an image from an image sensor. The image sensor may be part of an image capture apparatus (e.g., the image capture apparatus 110, the image capture device 210, or the image capture device 240).

In some implementations, the image sensor may be attached to a processing apparatus that implements the method 600. For example, the image may be accessed 610 from the image sensor via a bus (e.g., the bus 224). In some implementations, the image may be accessed 610 via a communications link (e.g., the communications link 250). For example, the image may be accessed 610 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be accessed 610 via communications interface 266. For example, the image may be accessed 610 as an input image signal, which may represent each pixel value in a defined format, such as in a RAW image format. In some implementations, the image may be frame of video, i.e., one of a sequence of images of a video. In some implementations, the image is accessed 610 directly from the image sensor without intermediate image processing. In some implementations, the image is accessed 610 after being subjected to intermediate image processing (e.g., correction of dead pixels, band processing, decoupling of vertical blanking, spatial noise reduction, and/or temporal noise reduction).

The method 600 includes detecting 620 an object area on the image and classifying 630 the detected object areas. For example, each detected object area may be classified into a first object area or a second object area. The first and second object areas are discussed for simplicity, and any number of object areas may be detected and classified. In some implementations, the first object area may include image areas that include one or more faces, a blue sky, or any other object where local tone mapping contrast enhancement is undesirable. The second object area may include any other objects that are not classified as the first object areas. For example, the second object area excludes image areas with faces, blue skies, or objects where local tone mapping contrast is undesirable. A single image may include any number of first object areas, second object areas, or both.

The method 600 includes applying 640 a filter to the second object area to obtain a low-frequency component image portion and a high-frequency component image portion. The filter may include a low-pass filter. In some implementations, the filter may include a Guassian blur. In some implementations, the filter may include a bilateral filter. For example, the bilateral filter may be defined by Equation 1 above. In some implementations, the high-frequency component image portion is determined as a compliment of the low-frequency component image portion (e.g., as $(x-\bar{x})$).

In some implementations, the computing resources (e.g., memory and/or processor cycles) consumed to apply 640 the filter may be reduced using approximations or other methods to reduce complexity. For example, where the filter includes a bilateral filter, a reduced resolution image (e.g., a bin 8 image) may be determined based on the image that is at a lower resolution than the image, and applying the bilateral filter may include processing pixels of the reduced resolution image as candidates (i.e., pixels within the window $\Omega(p_n)$ of the bilateral filter). For example, where a bin 8 image is used for the bilateral filter rather than a full resolution image the number of candidates processed by the bilateral filter may be reduced by a factor of approximately 64. In some implementations, an anti-alias Guassian filter (e.g., σ=8 pixels) may be applied prior to subsampling to determine the reduced resolution image. Applying 640 a bilateral filter may include subsampling candidates within a range of distances from a kernel center. The subsampling of candidates may be implemented with a sparse kernel or window $\Omega(p_n)$ for the bilateral filter. For example, applying 640 a bilateral filter may include subsampling candidates at a first subsampling factor within a first range of distances from a kernel center, and subsampling candidates at a second subsampling factor within a second range of distances from the kernel center. Filter weights of a sparse bilateral filter may be modified in order to mitigate changes in the filtering strength relative to a full resolution bilateral filter (e.g., the bilateral filter of Equation 1). An interpolation may be used to interpolate the candidates according to the position of the current pixel and to have a smooth continuous output.

The method 600 includes determining 650 a first enhanced image for the second type object area based on a weighted sum of the low-frequency component image portion and the high-frequency component image portion, where the high-frequency component image portion is weighted more than the low-frequency component image portion. Local contrast enhancement may be performed by tuning the proportion of details in an enhanced image that is determined as weighted sum of component image portions, including the low-frequency component image portion and the high-frequency component image portion. For example, the first enhanced image may be determined according to:

$$\acute{x}_n = \bar{x}_n + \alpha(x_n - \bar{x}_n)$$

where $\acute{x}$ is the first enhanced image, x is an image represented in a physical domain, and $\alpha > 1$ is a weight chosen to enhance details by weighting the high-frequency component image more heavily.

The method 600 includes determining 660 a second enhanced image for the second type object area based on the first enhanced image and a tone mapping. In some implementations, a global tone mapping, based on a tone curve $\lambda(\ )$, may be applied to the first enhanced image to determine 660 the second enhanced image. For example, the second enhanced image $\acute{x}$ may be determined 660 according to:

$$\acute{x}_n = \lambda(\acute{x}_n)\acute{x}_n$$

In some implementations, a tone mapping that depends on pixels in a local area may be applied to the first enhanced image to determine 660 the second enhanced image. For example, determining the second enhanced image based on the first enhanced image and the tone mapping may include applying the tone mapping to the low-frequency component image to obtain gains for respective image portions; and applying the gains for respective image portions to corresponding image portions of the first enhanced image. For example, the second enhanced image $\acute{x}$ may be determined 660 according to:

$$\acute{x}_n = \lambda(\bar{x}_n)\acute{x}_n$$

In some implementations, the tone mapping may be determined based on a histogram analysis of image portions of the of the low-frequency component image. For example, the tone curve $\lambda(\ )$ may be determined based on a histogram of values in the low-frequency component image $\bar{x}$. For example, the tone curve $\lambda(\ )$ may be determined to achieve a target histogram or distribution of luminance values for a resulting output image (e.g., to equalize the histogram of the low-frequency component image).

The method 600 includes determining 670 a perceptual domain image portion for the second type object area based on the second enhanced image and a gamma curve that models human perception of contrast. The perceptual domain image portion y may be determined 670 as $$y_n = \gamma(\acute{x}_n).$$

The method 600 includes determining 680 a low-frequency component perceptual domain image portion and a high-frequency component perceptual domain image portion for the second type object area as components of the perceptual domain image. In some implementations, the low-frequency component perceptual domain image portion $\bar{y}$ may be determined 680 by applying a filter (e.g., a bilateral filter or a Guassian blur) to the perceptual domain image portion y. However applying a filter a second time in the perceptual domain can consume significant computing resources (e.g., memory and/or processor cycles). To conserve computing resources, in some implementations, the low-frequency component perceptual domain image portion is determined 680 using an approximation that it is equal to the result of applying the gamma curve to the low-frequency component image portion that was previously determined in the physical domain, thus avoiding a second resource intensive application of a filter (e.g., a bilateral filter). Determining 680 the low-frequency component perceptual domain image portion may include applying a transformation, based on the gamma curve, to a result of applying the tone mapping to the low-frequency component image portion. For example, the low-frequency component perceptual domain image portion $\bar{y}$ may be determined 680 according to: $\bar{y}_n = \gamma(\lambda(\bar{x}_n)\bar{x}_n)$. For example, the high-frequency component perceptual domain image portion may be determined 680 as a compliment of the low-frequency component perceptual domain image portion, i.e., as $(y-\bar{y})$.

The method 600 includes determining 690 a third enhanced image for the second type object area based on a weighted sum of the low-frequency component perceptual domain image portion and the high-frequency component perceptual domain image portion, where the high-frequency component perceptual domain image portion is weighted more than the low-frequency component perceptual domain image portion. Local contrast enhancement may be performed by tuning the proportion of details in an enhanced perceptual domain image that is determined as weighted sum of component image portions, including the low-frequency component perceptual domain image portion and the high-frequency component perceptual domain image portion. For example, the third enhanced image may be determined according to:

$$\acute{y}_n = \bar{y}_n + \beta(y_n - \bar{y}_n)$$

where $\acute{y}$ is the third enhanced image, y is the perceptual domain image, and $\beta > 1$ is a weight chosen to enhance details by weighting the high-frequency component image more heavily.

It may be advantageous to apply gains associated with the third enhanced image in the physical domain, before the gamma curve application in order to avoid splitting the local tone mapping and to take advantage of a wider dynamic range. In some implementations, determining an output image based on the third enhanced image may include: determining gains for respective image portions based on the third enhanced image and the gamma curve; and applying the gains for respective image portions to corresponding image portions of the image. The representation of the third enhanced image in the physical domain is:

$$\acute{x}_n = \gamma^{-1}(\bar{y}_n + \beta(y_n - \bar{y}_n))$$

where $\acute{x}$ is the third enhanced image in the physical domain, and $\gamma^{-1}( )$ is the inverse transformation of the gamma curve. The detail enhancements of operations 650 and 690 may be combined. First determine gains relative to the enhancement in the physical domain as:

$$Gphys_n = \frac{Y\left(\acute{x}_n\right)}{Y(x_n)}$$

then the final tone mapping gains, which are the composition of the physical domain enhancement of operation 650 and the perceptual domain enhancement of operation 690, may be determined as:

$$Gtotal_n = \frac{Y\left(\acute{\acute{x}}_n\right)}{Y(x_n)} = \frac{Y(\gamma^{-1}(\gamma(Gphys_n \bar{x}) + \beta(\gamma(Gphys_n x) - \gamma(Gphys_n \bar{x}))))}{Y(x_n)}$$

These total gains may replace a global tone mapping gain, and can be applied on input image in the physical domain (e.g., an RGB format image) to determine mapped image.

The method 600 includes storing, displaying, or transmitting 695 an output image based on the second enhanced image and the first type object area. In some implementations, the output image is the second enhanced image. In some implementations, the second enhanced image may by subject to additional image processing (e.g., perceptual tone mapping with a gamma curve $\gamma( )$, lens distortion correction, electronic rolling shutter correction, stitching with parallax correction and blending to combine images from multiple image sensors, electronic image stabilization, and/or output projection) to determine the output image. For example, the output image may be transmitted 680 to an external device (e.g., a personal computing device) for display or storage. For example, the output image may be stored 695 in memory of a processing apparatus (e.g., the processing apparatus 212 or the processing apparatus 262). For example, the output image may be displayed 695 in the user interface 220 or in the user interface 264. For example, the output image may be transmitted 695 via the communications interface 218.

The detail enhancement (e.g., as performed at operations 450, 650, and 690) incorporated into a local tone mapping might lead to some dynamic range overflow or underflow. When these dynamic range violations occur near zero, they are called underflows. When these dynamic range violations occur near the saturation level of the pixel values, they are called overflows. For example, underflows can occur when $\alpha(x_n - \bar{x}_n) < -\bar{x}_n$ for at least one of the color channels. This may result in clipping and associated distortion of the output, where pixel values are constrained to be positive.

To avoid that, the component image values may be slightly modified when an underflow condition occurs, meaning that some high-frequency component image will be transferred to the low-frequency component image while preserving the sum of low and high frequency component images. Using this approach, in extreme worst cases, all the energy of a pixel will be transferred to the low-frequency component image and the tone mapping will locally reduce to the global tone mapping of $\acute{x}_n = \lambda(x_n)x_n$, so degradation of the image compared to global tone mapping only approach may be avoided.

Modifying the results only when the resulting value is below zero could lead to some discontinuities in the image. To avoid such discontinuities, this modification may be applied and interpolated in range near zero. (Note: to simplify the equations below, assume that x is a monochromatic image). A threshold $\mu$ is specified and energy is transferred between components of the image when $|\alpha(x_n - \bar{x}_n)| < \mu \bar{x}_n$. When this occurs, the goal is to modify corresponding image portions (e.g., pixels) of the low-frequency component image pixel and the high-frequency component image according to:

$$\bar{x}'_n = \bar{x}_n + \delta_n$$

$$d\bar{x}_n = (x_n - \bar{x}_n)' = x_n - \bar{x}_n - \delta_n = dx - \delta_n$$

The following equation may be solved in order to determine δ to preserve the contrast between the enhanced image (after underflow compensation) and the original image:

$$\frac{x_n - \bar{x}_n}{\bar{x}_n + (x_n - \bar{x}_n)} = \frac{\alpha((x_n - \bar{x}_n) - \delta_n)}{\bar{x}_n + \delta_n + \alpha((x_n - \bar{x}_n) - \delta_n)} \quad \text{Equation 2}$$

Finally, the resulting $\delta_n$ may be interpolated and applied as follows:

$$\hat{\delta}_n = 0, \text{ if } |\alpha(x_n - \bar{x}_n)| \le \mu_1 \bar{x}_n \quad \text{Equation 3}$$

$$\hat{\delta}_n = \delta_n \frac{r - \mu_1}{\mu_2 - \mu_1}, \text{ if } \mu_2 \bar{x}_n \le |\alpha(x_n - \bar{x}_n)| > \mu_1 \bar{x}_n$$

$$\hat{\delta}_n = \delta_n, \text{ otherwise}$$

where:

$$r = \frac{|\alpha(x_n - \bar{x}_n)|}{\bar{x}_n}$$

It should be noted that the methods described in relation to FIGS. 3-6 and similar methods may be applied to multiple images from different image sensors of image capture apparatus (e.g., the apparatus 110 shown in FIG. 1) The resulting tone mapped images may subsequently be combined using a stitching operation. In some implementations, multiple images from different image sensors of an image capture apparatus may be combined using a stitching operation and the combined image, which includes images from each of the image sensors, may subsequently be tone mapped using the methods described in relation to FIGS. 3-6 and similar methods.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
   an image sensor configured to capture an image; and
   a processing apparatus configured to:
   access the image from the image sensor;
   detect an object area on the accessed image;
   classify the detected object area into a first type object area or a second type object area;
   obtain a local tone mapping for the second type object area of the image;
   apply a bilateral filter to the second type object area of the image to obtain a low-frequency component image portion and a high-frequency component image portion;
   obtain, for the second type object area, a second enhanced image portion based on a weighted sum of the low-frequency component image portion and the high-frequency component image portion, wherein the high-frequency component image portion is weighted more than the low-frequency component image portion;
   obtain, for the second type object area, an enhanced image portion based on the local tone mapping; and
   store, display, or transmit an output image based on the enhanced image portion and the first type object area.

2. The system of claim 1, wherein the processing apparatus is further configured to:
   obtain, for the second type object area, a third enhanced image portion based on the second enhanced image portion and a tone mapping.

3. The system of claim 2, wherein the processing apparatus is further configured to:
   obtain, for the second type object area, a perceptual domain image portion based on the third enhanced image portion and a gamma curve that models human perception of contrast.

4. The system of claim 3, wherein the processing apparatus is further configured to:
   obtain, for the second type object area, a low-frequency component perceptual domain image portion and a high-frequency component perceptual domain image portion as components of the perceptual domain image portion.

5. The system of claim 4, wherein the processing apparatus is further configured to:
   obtain, for the second type object area, a fourth enhanced image portion based on a weighted sum of the low-frequency component perceptual domain image portion and the high-frequency component perceptual domain image portion, wherein the high-frequency component perceptual domain image portion is weighted more than the low-frequency component perceptual domain image portion.

6. The system of claim 1, wherein the first type object area is classified as a human face.

7. The system of claim 1, wherein the first type object area is classified as a blue sky.

8. The system of claim 1, wherein the processing apparatus is configured to enhance local contrast on the second type object area of the image.

9. The system of claim 1, wherein the processing apparatus is further configured to perform perceptual tone mapping, lens distortion correction, electronic rolling shutter correction, stitching with parallax correction, blending, electronic image stabilization, or output projection.

10. The system of claim 9, wherein the processing apparatus is configured to perform the perceptual tone mapping with a gamma curve.

11. A method comprising:
    obtaining an image from an image sensor;
    detecting an object area on the image;
    classifying the detected object area into a first type object area or a second type object area;
    applying a filter to the second type object area to obtain a low-frequency component image portion and a high-frequency component image portion;
    determining a first enhanced image portion for the second type object area based on a weighted sum of the low-frequency component image portion and the high-frequency component image portion, where the high-frequency component image portion is weighted more than the low-frequency component image portion;

determining a second enhanced image portion for the second type object area based on the first enhanced image portion and a tone mapping; and storing, displaying, or transmitting an output image based on the second enhanced image portion and the first type object area.

12. The method of claim 11, in which determining the second enhanced image portion for the second type object area based on the first enhanced image portion and a tone mapping comprises:

applying the tone mapping to the low-frequency component image portion to obtain gains for respective image portions; and applying the gains for respective image portions to corresponding image portions of the first enhanced image portion.

13. The method of claim 11, further comprising:

determining a perceptual domain image for the second type object area based on the second enhanced image portion and a gamma curve that models human perception of contrast;

determining, for the second type object area, a low-frequency component perceptual domain image portion and a high-frequency component perceptual domain image portion as components of the perceptual domain image;

determining, for the second type object area, a third enhanced image portion based on a weighted sum of the low-frequency component perceptual domain image portion and the high-frequency component perceptual domain image portion, where the high-frequency component perceptual domain image portion is weighted more than the low-frequency component perceptual domain image portion; and wherein the output image is based on the third enhanced image portion and the first type object area.

14. The method of claim 13, in which determining the low-frequency component perceptual domain image portion comprises applying a transformation, based on the gamma curve, to a result of applying the tone mapping to the low-frequency component image portion.

15. The method of claim 13, in which determining the output image comprises:

determining gains for respective image portions based on the third enhanced image portion and the gamma curve; and applying the gains for respective image portions to corresponding image portions of the image.

16. An image capture device comprising:
an image sensor configured to capture an image; and
a processing apparatus configured to:
  access the image from the image sensor;
  detect an object area on the accessed image;
  classify the detected object area into a first type object area or a second type object area;
  apply a filter to the second type object area to obtain a low-frequency component image portion and a high-frequency component image portion;
  apply a non-linear mapping to the low-frequency component image portion to obtain gains for respective image portions;
  apply the gains for respective image portions to corresponding image portions of the second type object area to obtain an enhanced image portion; and
  store, display, or transmit an output image based on the enhanced image and the first type object area.

17. The image capture device of claim 16, in which the processing apparatus is configured to:

determine the non-linear mapping based on a histogram analysis of image portions of the low-frequency component image portion.

18. The image capture device of claim 16, in which the processing apparatus is configured to:

determine, for the second type object area, a perceptual domain image portion based on the enhanced image and a gamma curve that models human perception of contrast;

determine, for the second type object area, a low-frequency component perceptual domain image portion and a high-frequency component perceptual domain image portion as components of the perceptual domain image;

determine, for the second type object area, an enhanced perceptual domain image based on a weighted sum of the low-frequency component perceptual domain image portion and the high-frequency component perceptual domain image portion, where the high-frequency component perceptual domain image portion is weighted more than the low-frequency component perceptual domain image portion; and wherein the output image is based on the enhanced perceptual domain image and the first type object area.

19. The image capture device of claim 18, in which the processing apparatus is configured to determine the low-frequency component perceptual domain image, the processing apparatus is further configured to apply a transformation, based on the gamma curve, to a result of applying the gains for respective image portions to the low-frequency component image portion.

20. The image capture device of claim 18, in which the processing apparatus is configured to determine the output image, the processing apparatus is further configured to:

determine gains for respective image portions based on the enhanced perceptual domain image and the gamma curve; and apply the gains for respective image portions to corresponding image portions of the image.

* * * * *